Sept. 23, 1969        E. E. HUHTA-KOIVISTO        3,469,137
                   ELECTRIC UNIPOLAR MOTOR
                    Filed Aug. 30, 1966

United States Patent Office 3,469,137
Patented Sept. 23, 1969

3,469,137
ELECTRIC UNIPOLAR MOTOR
Esko Ensio Huhta-Koivisto, Helsinki, Finland, assignor to Merwoimien Esikunta, Helsinki, Finland, a corporation of Finland
Filed Aug. 30, 1966, Ser. No. 576,137
Int. Cl. H02k 31/02
U.S. Cl. 310—178    4 Claims

ABSTRACT OF THE DISCLOSURE

Greater operating efficiency is achieved in an electric unipolar motor by an arrangement of slip rings and brushes which permits operation at high circumferential speeds and therefore at higher operating voltages. Very light weight, liquid cooled brush rings cooperate with slip rings for high speed operation.

---

Figure 1:
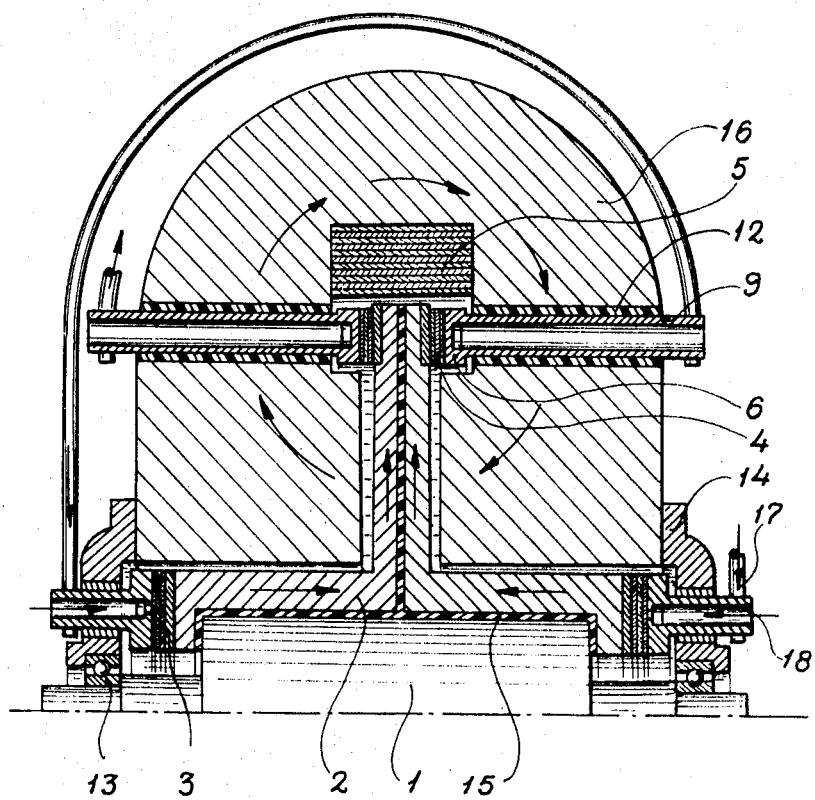

This invention relates to an improvement in an electric unipolar motor and more specifically to an arrangement in the slip rings thereof. It is desirable to provide a unipolar motor having a high power output at minimum weight and overall dimensions while maintaining a reasonably high efficiency. These properties are of a decisive significance for the use of batteries for the propulsion of traffic vehicles, self-propelling apparatuses and the like. To achieve the above-mentioned properties, the motor should run at a sufficiently high speed from which it follows that there is a high speed also at the slip surfaces. Further, it is desirable to provide slip rings having a high loading capacity, and to minimize the effect of eddy currents and the armature reaction as much as possible.

Conventional constructions of unipolar motors usually operate at low voltages, which probably is the reason why unipolar motors have found only restricted use. To produce higher voltages, high circumferential speeds are required, and then the feeding of current to the rotor causes difficulties. It would therefore be necessary to arrange cooling of the current conductors.

The use of liquid brushes in electrical motors is known. A liquid brush construction comprises a slip ring rotating in a groove which is filled with a conductive liquid, such as for example a sodium sulphate solution or metallic mercury. The liquid will be retained in the groove by the action of centrifugal force. Such a system using liquid brushes is, however, not applicable to small and transportable motors.

Cooling of the slip rings by the intermediary of the armature is also known. However, the transfer of liquid to the armature, which rotates at high speed, presents great difficulties, and as there must be no borings or other discontinuities in the armature because of eddy current losses, the cooling of the slip rings of the armature is very complicated and causes disturbances.

The present invention has for its object to provide an arrangement of the brush and slip rings of a unipolar motor which will render it possible to eliminate the above described problems.

The invention relates to a slip ring arrangement in a unipolar motor having a high circumferential speed of the magnitude of 150–250 meters per second and a steel armature without separate winding, and having further slip rings on the armature, and stationary brush rings, said slip rings and brush ring having coacting slip surfaces perpendicular to the shaft of the motor, said slip rings being along their whole longitudinal extension in electrically conductive metallic contact with the armature, and said brush rings being formed with means for the circulation of a cooling liquid.

The invention provides a light weight and liquid cooled brush construction which renders it possible to use high slip speeds and great loads. At the same time the conducting of current and cooling liquid to the brush can be effected in a simple and inexpensive manner.

The invention will be described in the following with reference to an embodiment shown in the accompanying drawing. In the drawing FIG. 1 shows an axial section of the upper half of a unipolar motor in accordance with the invention, and FIG. 2 is a detail showing a sectional view of a brush ring of the motor of FIG. 1.

Figure 2:
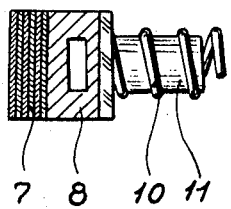

The principal construction of the motor according to the invention is schematically shown in FIG. 1. As appears from said figure, a magnetic field is generated by a magnet coil 5 in a surrounding steel body 16. This magnetic field is divided by a rotor 2 and thus passes through the rotor. Current 17 is supplied at the one end of the rotor whence it flows along the periphery thereof through one half of the rotor to a central space. From here the current is conducted by means of brush rings and conductor pins to the surface of the rotor and from there by means of brush cables to the opposite end of the rotor and further through the other half of the rotor to an upper brush and out through conductor pins.

The rotor shaft 1 is formed of a body having a cylindrically enlarged central portion. On this central portion two rotor halves are mounted by shrinking on. These halves are electrically insulated from each other and from the shaft, as indicated at 15. A rotor half is formed by two flanges carried by a connection piece. The rotor is made of steel, wherefore it does not cut the magnetic field and at the same time it resists well the strains caused by the high rotation speeds. The rotor halves serve also directly as armature coils and consequently they do not carry special coils of copper wire. Current is fed to the rotor halves and taken out therefrom by means of two pairs of slip rings 3 and 4 respectively made of for example bronze which are attached to the flanges of the rotor by hard-solder. The rotor shaft 1 is journalled in two ball bearings 13 which are mounted in bearing brackets 14 by close running fit. These brackets 14 must be made of non-magnetic material, such as bronze or stainless steel, in order to prevent the magnetic flux from passing through the bearings.

The central portion of the rotor is surrounded by a space having a substantially square cross-sectional shape. A magnet winding 5 and brush rings 6 are provided in the said space. The magnet winding 5 is made of copper strip which will give a good filling coefficient and advantageous heat conduction properties.

The stator forms the major part of the magnetic circuit surrounding the magnet winding 5 which magnetic circuit is finally closed by the central steel rotor 2. The stator is formed of two or more steel bodies 16. In view of magnetization and weight considerations the magnetic circuit should advantageously be as short as possible. That is the reason why the space containing the magnet winding and the upper brushes should have square cross-sectional shape and be as small as possible. The most advantageous conditions are obtained when the cross-sectional area of the magnetic circuit is constant and substantially equal to the maximum cross-sectional area of the rotor.

The brush rings are formed in the following manner in accordance with the invention: A brush ring is formed of metal graphite ring 7 (FIG. 2) which has been soldered to a copper ring 8 in which a channel for liquid is formed. The current supply to the brush 6 is provided by means of four copper pipes 9 which at the same time serve as inlet and outlet pipes for the coolant liquid, such as water. The copper pipes are externally coupled in the manner indicated in FIG. 1 by means of flexible brush cables. The inlet and outlet pipes for the coolant liquid should also be flexible and electrically insulating. A pipe of any suitable plastic material may advantageously be used for that purpose. The brush rings are spring loaded by springs 10 which are insulated from the brush by means of plastic pins 11. Further the copper pipes are insulated from the frame by plastic sleeves 12. The lower brushes are constructed in a similar manner and they are carried by the bearing brackets 14.

The arrangement of the brush rings in accordance with the invention is advantageous in the following respects.

The maximum circumferential speed possible in prior known constructions has been about 40 meters per second whereas the arrangement of the present invention enables speeds up to 200 meters per second because of the favourable liquid cooling in the immediate vicinity of the slipping surfaces of the brushes.

Ordinarily the maximum allowable current density has been about 20 a./sq. cm. but the construction in accordance with the invention permits a current density of 60 a./sq. cm.

The brush rings are of a very light construction so that they can easily follow the slip rings at high rotation speeds, and it is easy to replace the brush rings which form the fastest wearing parts of the motor.

What we claim is:

1. Arrangement in an electric unipolar motor for high circumferential speeds and comprising steel armature without special coils and being formed of two halves insulated from each other, slip ring means on each of said armature halves for rotation therewith, and stationary brush ring means positioned for slip contact with each of said slip ring means respectively along surfaces perpendicular to the axis of rotation of said armature, an electrically conductive solid connection between each of said slip ring means and said armature halves respectively along the entire circumferential extension of said slip ring means, each of said brush ring means being formed with means for circulation of a coolant through said brush ring means adjacent to the slip contact surface thereof, and means for connecting said brush ring means adjacent to the opposite halves of said armature in series to a source of electric current.

2. Arrangement in an electric unipolar motor for high circumferential speeds and comprising a rotatable steel armature without special coils, a stator surrounding said armature, slip ring means on said armature for rotation therewith, and stationary brush ring means positioned for slip contact with each of said slip ring means respectively along surfaces perpendicular to the axis of rotation of said armature, an electrically conductive solid connection between each of said slip ring means and said armature along the entire circumferential extension of said slip ring means, each of said brush means comprising an annular slip surface consisting of a carbonaceous material and a metallic ring having a channel for a coolant formed therein, said slip surface being soldered to said metallic ring, and means for connecting said brush ring means to a source of electric current.

3. Arrangement in an electric unipolar motor as in claim 2, comprising spring means for pressing said brush means in an axial direction against said slip ring means.

4. Arrangement in an electric unipolar motor as in claim 2, wherein hollow members consisting of a conductive material are connected to each of said brush ring means, wiring means connecting said members to source of electric current, said hollow members opening into the channels of said metallic rings for passing a coolant through said channels.

References Cited
UNITED STATES PATENTS

| | | | |
|---|---|---|---|
| 3,206,630 | 9/1965 | Berger et al. | 310—227 |
| 2,790,100 | 4/1957 | Caputo et al. | 310—227 |
| 2,774,898 | 12/1956 | Tourneau | 310—239 |
| 1,273,409 | 7/1918 | Roulland | 310—227 |

MILTON O. HIRSHFELD, Primary Examiner

M. O. BUDD, Assistant Examiner

U.S. Cl. X.R.

310—143, 227, 232, 248